United States Patent

Wittlinger et al.

[15] 3,671,782

[45] June 20, 1972

[54] SAMPLE-HOLD AND READ CIRCUIT

[72] Inventors: Harold Allen Wittlinger, Pennington; Carl Franklin Wheatley, Jr., Somerset; Russell Daniel Knapp, Somerville, all of N.J.

[73] Assignee: RCA Corporation

[22] Filed: Dec. 1, 1970

[21] Appl. No.: 93,965

[52] U.S. Cl. ............................... 307/238, 307/229, 328/151

[51] Int. Cl. ......................................................... H03k 17/00

[58] Field of Search .................. 328/151, 150; 307/238, 229, 307/230

[56] References Cited

UNITED STATES PATENTS

| | | | |
|---|---|---|---|
| 3,550,014 | 12/1970 | Richardson et al. | 328/150 X |
| 3,363,113 | 1/1968 | Bedingfield | 328/151 |
| 3,504,194 | 3/1970 | Eastman et al. | 307/238 |

OTHER PUBLICATIONS

IBM Tech. Disclosure Bulletin, Peaking and Noise Suppression Circuitry by Brondu et al. Vol. 9 No. 6 11/66 page 588

*Primary Examiner*—John S. Heyman
*Assistant Examiner*—B. P. Davis
*Attorney*—Edward J. Norton

[57] ABSTRACT

A sample and hold circuit using a first and second operational transconductance amplifier with a voltage storing device connected in circuit between the first and second amplifiers. A sample of the amplitude level of an input signal is stored in the storage device at predetermined times when the first amplifier is rendered operative. The sampled level is provided at the circuit output terminal at other predetermined times when the second amplifier is rendered operative.

6 Claims, 3 Drawing Figures

Inventors:
HAROLD A. WITTLINGER,
CARL F. WHEATLEY, JR &
RUSSELL D. KNAPP

BY Edward J Norton
Attorney

SAMPLE-HOLD AND READ CIRCUIT

The invention relates to sample and hold circuits and especially to sample and hold circuits, using operational transconductance amplifiers, with a further provision for selectively reading out the sample signals.

Sampling a signal waveform and holding the sample in a signal storage device for future signal processing is a known circuit function.

There are many uses for sample and hold circuits in the signal processing art. One such use arises when a particular input signal varies at a very fast rate and the output utilization device is unable to respond at the cyclic rate of the input signal. Another use for sample and hold circuits arises in the area of signal multiplexing. In a signal multiplexing system an input signal may be sampled at several different times and the sampled values may then be processed over several corresponding channels.

One of the common arrangements for a sample and hold circuit is a switch followed by a storage capacitor which is connected to an output circuit. One of the serious drawbacks with the switch-capacitor sample and hold circuit is the difficulty in isolating the storage element from the input and output circuits. When the switch does not perform close to the theoretical switch function, unwanted input signals may be passed through the switch and modify the voltage of the storage device. Furthermore, the output circuit often represents a load on the storage capacitor causing the stored signal to discharge through the capacitor prematurely.

To overcome some of the previously mentioned problems it is desirable to read out the sampled signals held in the storage device through an output circuit with a high impedance so that the output circuit will not drain the charge from the storage capacitor for a fairly long period of time. A device having desireable qualities for a sample-hold and read function is the operational transconductance amplifier (OTA).

An operational transconductance amplifier has a pair of differential input terminals. One terminal is denoted as an inverting terminal since signals applied thereto cause an output signal to be produced which is out-of-phase or inverted with respect to the applied input signal. The other input terminal is denoted as the non-inverting input terminal since signals applied thereto cause an output signal to be produced which is in-phase with respect to the applied input signal.

The operational transconductance amplifier also has a current biasing terminal for the application of an external current bias for controlling the conductive level and thereby the transconductance of the amplifier. The transconductance of the OTA is directly proportional to the level of bias current applied to the current biasing terminal.

The output signal of the OTA is a current as opposed to a voltage output signal in a conventional operational amplifier. The output current of the OTA is proportional to the product of the transconductance of the amplifier and the differential input signal.

In terms of a sample-hold and read application, one of the important characteristics of the OTA is the high impedance when gated off as compared to the load impedance and as compared to the relatively low output impedance of a conventional operational voltage amplifier. As a result, the forward gain characteristic of the OTA is best described by transconductance rather than voltage gain.

The details for implementing the construction of an amplifier having the characteristics previously mentioned in connection with the OTA are described in co-pending application, Ser. No. 847,879, now U.S. Pat. No. 3,614,645 assigned to the present assignee. The amplifier therein described is presently available, in integrated form, with three amplifiers to a chip, having the designation number CA 3060.

In accordance with the sample and hold circuit of the present invention, first and second operational transconductance amplifiers are provided wherein the output terminal of the first amplifier is connected to one input terminal of the second amplifier and one input terminal of the first amplifier is connected to the output terminal of the first amplifier. A voltage storage means is connected between the output terminal of the first amplifier and a point of reference potential. Means are provided at the current biasing terminal of the first amplifier for selectively rendering the first amplifier operative whereby a sample of the input signal applied to the other input terminal of the first amplifier is stored in the storage means. Second means are provided at the current biasing terminal of the second amplifier for selectively rendering the second amplifier operative, at second predetermined times for providing an output signal at the second amplifier output terminal.

With the sample and hold circuit of the present invention the problems of unwanted input signal feed through and stored signal drain are diminished due to the fact that at the time signals are being held in the storage means, and the first and second amplifiers are not made operative, the storage means is essentially disconnected from both the input and output circuits due to the relatively high impedances of the amplifiers when biased off.

Figure 1:
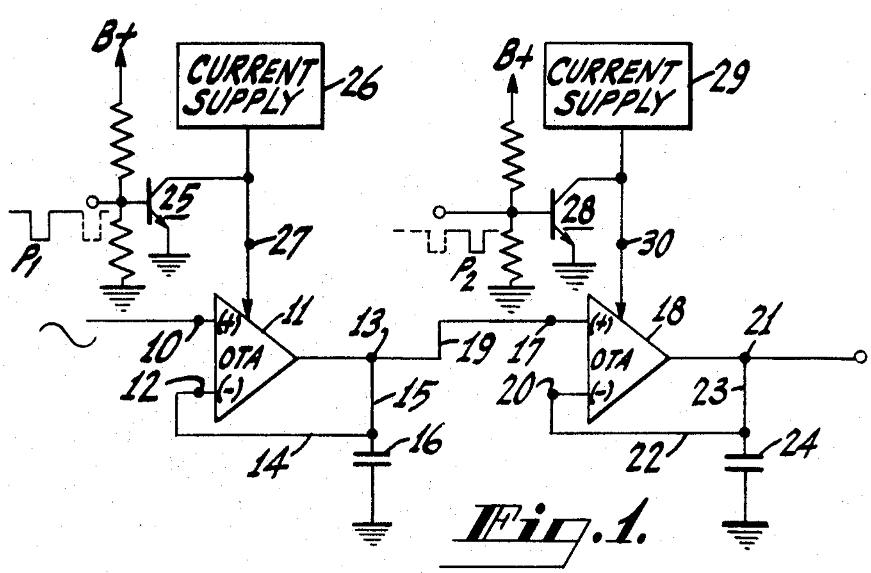
FIG. 1 is a block and partial schematic diagram of an embodiment of the invention in a sample-hold and read circuit.

Referring now to FIG. 1, an input signal is applied to the non-inverting input terminal 10 of operational transconductance amplifier 11 from a source (not shown). The inverting input terminal 12 of amplifier 11 is connected to the output terminal 13 via lines 14 and 15. With the connections made as shown in FIG. 1 the output current at terminal 13 will vary in accordance with or proportional to the signal applied at terminal 10.

A voltage storage device, shown as capacitor 16 is connected between terminal 13 and a point of reference potential shown as a ground reference in FIG. 1.

The output terminal 13 of OTA 11 is connected to the non-inverting terminal 17 of OTA 18 via line 19. It may be desirable in some applications to include additional series impedance elements in line 19, however, the connection of terminal 13 to terminal 17 is shown as a straight through connection for simplicity in the present embodiment.

Inverting terminal 20 of OTA 18 is connected back to output terminal 21 via lines 22 and 23 giving OTA 18 a topographical appearance similar to OTA 11. A stabilizing capacitor 24 is connected between terminal 21 and the point of reference potential. Capacitor 24 is normally small compared to capacitor 16. Capacitor 24 may be on the order of 100 picofarads while capacitor 16 may be typically in the range of 0.01–0.05 microfarads.

OTA 11 is selectively rendered operative by causing the normally ON current shunting transistor 25 to go OFF whereby current from a current supply 26 is made available at current biasing terminal 27. The means for supplying current to terminal 27 may take many different forms. For example, the output terminal of another OTA may be connected to the terminal 27, or some other form of a current shunting switch such as a field effect transistor or a silicon controlled rectifier may be used. The important feature being that OTA 11 is turned ON from its normally OFF condition at predetermined times. Upon the application of pulse $P_1$ to transistor 25, current flows into terminal 27 of OTA 11. For essentially the duration of pulse $P_1$, OTA 11 is in its ON state and a current responding to the amplitude of the input signal at this time, charges the storage capacitor 16. OTA 18 is maintained in its normally OFF state for the duration of pulse $P_1$.

At some time later, when it is desired to read out the signal information stored in capacitor 16, current shunting transistor 28 is turned OFF by a pulse $P_2$ which allows current from current supply 29 to flow into the current biasing terminal 30, of OTA 18, causing OTA 18 to be turned ON. Again the combination of transistor 28 and current supply 29 may take any form desired which will allow OTA 18 to be selectively rendered operative.

Upon the application of pulse $P_2$, at a time subsequent to pulse $P_1$, OTA 18 is turned ON and a current flows through the output terminal 21 which is representative of the signal previously stored in capacitor 16.

During the interpulse period of time, that is the time between pulses $P_1$ and $P_2$, the capacitor 16, having a charge corresponding to the desired sample of the input signal, is essentially disconnected from both the input circuit and the output circuit due to the high impedances of OTA 11 and OTA 18 when biased off.

Figure 2:
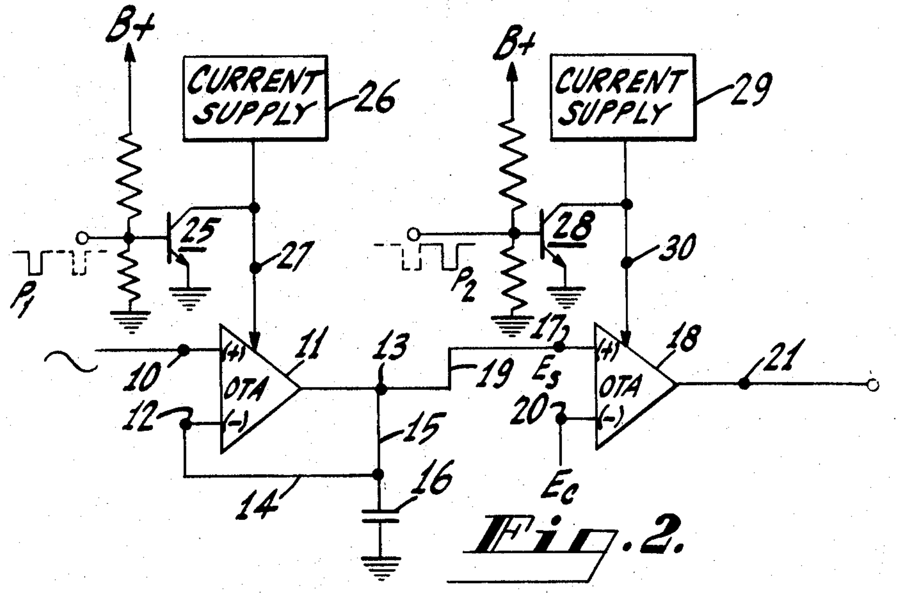
FIG. 2 is a block and partial schematic diagram of an embodiment of the invention in a sample-hold-read and compare circuit.

Referring now to FIG. 2, where similar components are designated with the same identifying notation as in FIG. 1, a circuit modification is shown wherein a sample-hold and compare function is performed.

The arrangement of FIG. 2 is identical to that of FIG. 1 with the exception that the feedback loop and stabilizing capacitor have been left out of FIG. 2 and a d.c. reference signal $E_c$ is applied to inverting terminal 20 of OTA 18.

In FIG. 2, when pulse $P_1$ is applied to the semi-conductor shunt switch 25, and bias current is supplied at terminal 27, a sample of the amplitude of the signal at terminal 10 appears on storage capacitor 16. Since one end of capacitor 16 is connected to input terminal 17 of OTA 18 via lines 15 and 19, the stored signal level, $E_s$, on capacitor 16 is available at input terminal 17 of OTA 18.

A d.c. signal, $E_c$, is applied to the inverting terminal 20 of OTA 18. When pulse $P_2$ is applied to semi-conductor shunt switch 28, OTA 18 is rendered operative. Since the transconductance of the OTA is generally high in value, a relatively small difference in the voltages applied to input terminals 17 and 18 causes OTA 18 to go into saturation. When saturated, the output signal is a saturation current $I_{sat}$ which indicates whether the sampled signal $E_s$ is higher or lower in amplitude than the comparison signal $E_c$.

Figure 3:
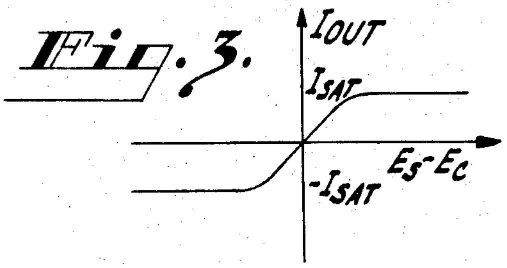
FIG. 3 is a curve of output current versus differential input voltage associated with the second amplifier of FIG. 2.

FIG. 3 shows the output current response at output terminal 21 of OTA 18 upon the application of various differential voltages to the input terminals 17 and 20. When the difference between $E_s$ and $E_c$ is small, for example plus or minus 0.5mv, OTA 18 operates in a linear fashion. If $E_s$ is greater in amplitude than $E_c$ by more than 0.5mv, in the example given, the output current at terminal 21 reaches the saturation value, $I_{sat}$. Similarly, for all voltage differences where $E_c$ is greater than $E_s$ by 0.5 mv or more, the output current will saturate at $-I_{sat}$. Thus, the arrangement in FIG. 2 provides an amplitude comparison circuit for a wide range of input voltage differences with a small linear region at the center of the operating region. The primary use for such a circuit is a threshold detector where some utilization device may be keyed on when the amplitude of the sampled input signal has a certain relationship to the amplitude of a reference signal.

What is claimed is:

1. A sample and hold circuit comprising:

first and second operational transconductance amplifiers, each having an inverting and a non-inverting input terminal, a current biasing terminal and an output terminal, the output terminal of the first amplifier being connected to one input terminal of the second amplifier, and one input terminal of the first amplifier being connected to the output terminal of the first amplifier;

means for applying an input signal to the other input terminal of the first amplifier;

voltage storage means connected between the output terminal of the first amplifier and a point of reference potential;

first means connected to the current biasing terminal of the first amplifier for selectively rendering said first amplifier operative at predetermined times; and second means connected to the current biasing terminal of said second amplifier for selectively rendering said second amplifier operative at other predetermined times, an output signal appearing at the second amplifier output terminal at said other predetermined times;

said voltage storage means being substantially isolated from said other input terminal of said first amplifier and from said output terminal of said second amplifier during times between said predetermined times and said other predetermined times.

2. The circuit according to claim 1 wherein the other input terminal of the second amplifier is connected to the second amplifier output terminal.

3. The circuit according to claim 2 wherein a capacitor is connected between the output terminal of the second amplifier and said point of reference potential.

4. The circuit according to claim 1 further comprising means for applying a comparison signal to the other input terminal of the second amplifier, the polarity of the output signal of said second amplifier being dependent upon the difference in the amplitude levels of the comparison signal and the signal applied to said one input terminal of the second amplifier.

5. The circuit according to claim 1 wherein said first and second means comprise a source of bias current and a semiconductor switch.

6. A sample and hold circuit comprising:

first and second operational transconductance amplifiers, each having an inverting and a non-inverting input terminal, a current biasing terminal and an output terminal, the output terminal of the first amplifier being connected to the non-inverting input terminal of the second amplifier, and the inverting input terminal of the first amplifier being connected to the output terminal of the first amplifier;

means for applying an input signal to the non-inverting input terminal of the first amplifier;

voltage storage means connected between the output terminal of the first amplifier and a point of reference potential;

first semiconductor switching means connected to the current biasing terminal of the first amplifier for selectively supplying current from a source of current at predetermined times, said first amplifier being rendered operative at said predetermined times; and second semiconductor switching means connected to the current biasing terminal of the second amplifier for selectively supplying a current from another source of current at other predetermined times, said second amplifier being rendered operative and supplying an output signal, at the second amplifier output terminal, at said other predetermined times;

said voltage storage means being substantially isolated from said non-inverting input terminal of said first amplifier and from said output terminal of said second amplifier during times between said predetermined times and said other predetermined times.

* * * * *

UNITED STATES PATENT OFFICE
CERTIFICATE OF CORRECTION

Patent No. 3,671,782 Dated June 20, 1972

Inventor(s) Harold A. Wittlinger et al

It is certified that error appears in the above-identified patent and that said Letters Patent are hereby corrected as shown below:

On the Title and Abstract page:

After "[21] Appl. No. 93,965" insert

--Foreign Application Priority Data
February 16, 1970 Great Britain . . . . .7368/70--

Signed and sealed this 6th day of March 1973.

(SEAL)
Attest:

EDWARD M.FLETCHER,JR.
Attesting Officer

ROBERT GOTTSCHALK
Commissioner of Patents